Figure 1:
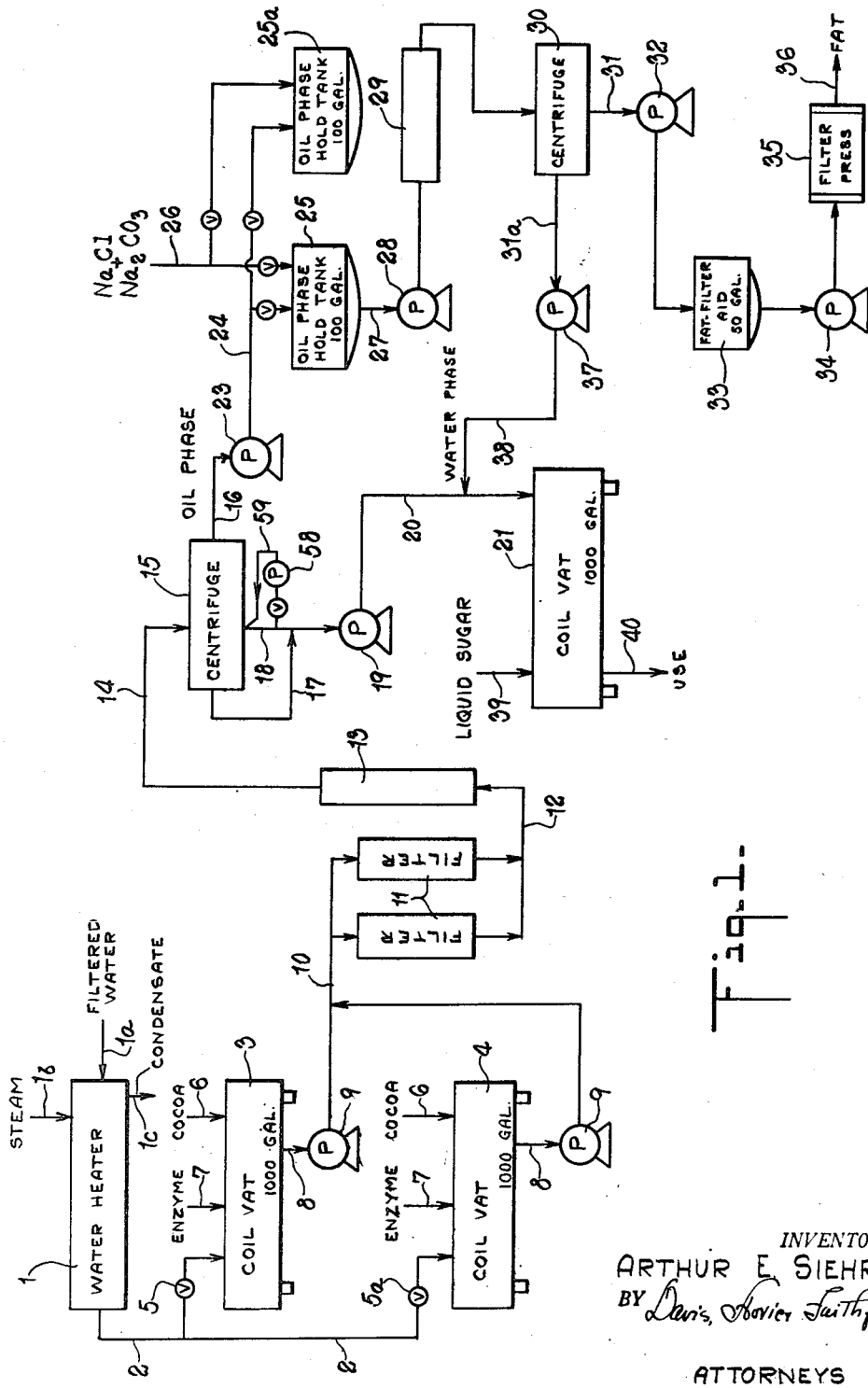

Aug. 31, 1954 A. E. SIEHRS 2,687,959
PROCESSING OF COCOA BEANS
Filed March 21, 1952 2 Sheets-Sheet 2

INVENTOR.
ARTHUR E. SIEHRS
BY
ATTORNEYS

Patented Aug. 31, 1954

2,687,959

UNITED STATES PATENT OFFICE 2,687,959

PROCESSING OF COCOA BEANS

Arthur E. Siehrs, Chicago, Ill., assignor to Krim-Ko Corporation, Chicago, Ill., a corporation of Illinois Application March 21, 1952, Serial No. 277,787

11 Claims. (Cl. 99—26)

This invention relates to the treatment of cocoa, chocolate liquor, cocoa beans or nibs in the production of cocoa flavoring for chocolate syrups, and the like. It has particularly reference to an improved process by which the cocoa flavoring is obtained substantially free from cooca butter, and the latter is extracted in a practically pure form.

Cocoa beans have a substantial fat content in the form of cocoa butter. Cocoa beans, nibs, chocolate liquor, and cocoa contain varying amounts of cocoa butter ranging from 55% in beans to 8 or 9% in the lowest normally produced low fat cocoas. While the present process can be used with slight modification to remove the cocoa butter from beans, nibs, liquor or cocoa, the invention will be described for illustrative purposes in connection with the removal of cocoa butter from cocoa. In the manufacture of chocolate flavored products such as chocolate flavored syrup or beverages, it is desirable to obtain the chocolate flavoring as free as possible from cocoa butter or fat. The fat does not improve the flavoring value of the material for chocolate syrups, and its presence in substantial amounts is apt to impair the keeping quality of the product. Moreover, the fat when extracted as cocoa butter is of considerable value commercially.

The starches in raw cocoa have a particularly strong affinity for the fatty materials, which accounts at least in part for the difficulty in effecting even approximately complete extraction of the cocoa butter. It has long been known that the fatty material held in the cocoa can be largely released by heating an aqueous mixture of the finely divided cocoa to gelatinize the insoluble starch, and then saccharifying the gelatinized starch by an enzymatic action so that it is brought into solution. The liberated fatty material or oil is lighter than the other constituents of the mixture; and it has been proposed heretofore to separate it from the other constituents by gravity settling or centrifugation, or by a combination of these expedients. For example, Hocker Patents Nos. 1,650,355 and 1,650,356 (dated November 22, 1927) and 1,680,943 (dated August 14, 1928) disclose various techniques utilizing gravity for separating the oil; Hocker Patent No. 1,751,331 (dated March 18, 1930) discloses centrifugal separation by successively paring the oil and then the other constituents from a centrifugal bowl; and Hocker Patents Nos. 1,803,615 (dated May 5, 1931) and 1,882,013 (dated October 11, 1932) disclose separations utilizing various combinations of the gravity and centrifugal techniques.

However, these prior proposals leave much to be desired, both in economy of operation and in the quality of the products. Gravity settling, even with liberation of $CO_2$ as proposed by Hocker, is too time-consuming for good commercial practice and does not enable a clean separation. The use of centrifugal separation as disclosed by Hocker requires a careful paring of the separated components in succession from the centrifugal bowl, and in most cases is dependent upon a preliminary gravity settling. A major difficulty in the centrifugal separation of the material is the relatively small spread between the specific gravities of the cocoa butter oil and the other liquid constituents, and the strong tendency for the oil and water to form an emulsion which carries some of the other materials and is difficult to separate. In an effort to facilitate the separation, Hocker proposes to add sugar to the mixture prior to the centrifuging, to increase the specific gravity of the heavier liquid relative to that of the oil; but the large quantity of sugar required for any appreciable effect in this respect causes such an increased loading of the system as to substantially nullify its advantages. Further, it requires a long period of heating, which greatly decreases the flavor value of the resulting products and greatly increases the bacterial hazard.

According to the present invention, the insoluble starches in the cocoa are gelatinized by heating an aqueous solution of the cocoa, and are then subjected to an enzymatic saccharification to liberate the cocoa butter or oil. After addition of a protein-coagulating agent, such as common salt, the mixture is fed continuously through a centrifugal bowl (locus of centrifugal force) where it is separated into an oil and water component and a substantially oil-free component. I do not attempt in this separation to obtain even an approximately pure oil. Instead, the centrifuge is adjusted to separate practically all of the oil from the main body of insoluble cocoa solids (sludge) and the watery extract of soluble cocoa solids, and in such separation some of the extract and possibly some of the solids will necessarily accompany the oil and the water with which it is emulsified. Since the mixture undergoing this centrifugation will normally contain all of the original oil content of the cocoa, there will be a substantial quantity of oil to act as a nucleus for the separation of the oil from the main extract and sludge.

The substantially oil-free component and the oil and water component (with its contained extract) are discharged simultaneously but separately from the centrifugal bowl, and the oil and water component is subjected to an emulsion-breaking treatment. At this point, I prefer to adjust the pH value of the oil and water component to about 9 (as by the addition of $Na_2CO_3$), add a protein-coagulating agent, and heat and hydrate this component. It is then recentrifuged to separate it into oil and water phases. The separated water phase from the second centrifuging is returned to the substantially oil-free component discharged from the first centrifuging, and sugar is added to these combined materials for production of a chocolate syrup. The oil phase discharged from the second centrifuging is substantially pure, although it may be filtered to improve its quality for commercial use as cocoa butter.

The new process enables an economical and practically complete recovery of the cocoa butter from the starting material, and in a continuous manner. Also, the process is advantageous with respect to the quality and yield of the cocoa flavoring for use in making chocolate syrups. The combined oil-free component from the first centrifuging and water phase from the second centrifuging include substantially all of the water utilized in the process and yet form a concentrated extract which can be used directly for chocolate syrup production. By hydrating the oil and water component prior to the second centrifuging, the added water serves to wash the oil and also to dilute the sludge or concentrated cocoa solids obtained from the first centrifuging.

A further feature of the invention resides in the manner of effecting the separation of the oil from the cocoa mixture in the first centrifuging. Preferably, this separation is made in a centrifuge of the type having outlet nozzles in the outer periphery of the centrifugal bowl, for discharging separated solids in jets, and separate outlets for a light component (oil) and an intermediate component (extract). In other words, the substantially oil-free component is separated into two sub-components, the heavier of which contains a relatively high proportion of solids and is discharged as sludge through the nozzles. The lighter sub-component is mainly a watery extract of soluble cocoa solids and is discharged through the intermediate outlet. In this way, the sludge can be discharged without clogging the bowl and is impacted and broken up against the usual stationary receiver surrounding the bowl. The discharged sludge is then returned to the extract discharged as the intermediate component, with which the water phase obtained from the second centrifuging also is preferably joined. This manner of centrifuging not only enables a higher throughput rate but also improves the quality of the final cocoa flavoring material. If desired, some of the discharged sludge may be recycled to the first centrifuging, in order to decrease the water content of the discharged material. Preferably, the sludge, if recycled, is returned directly to the peripheral part of the centrifugal bowl in the region of the discharge nozzles.

Figure 2:
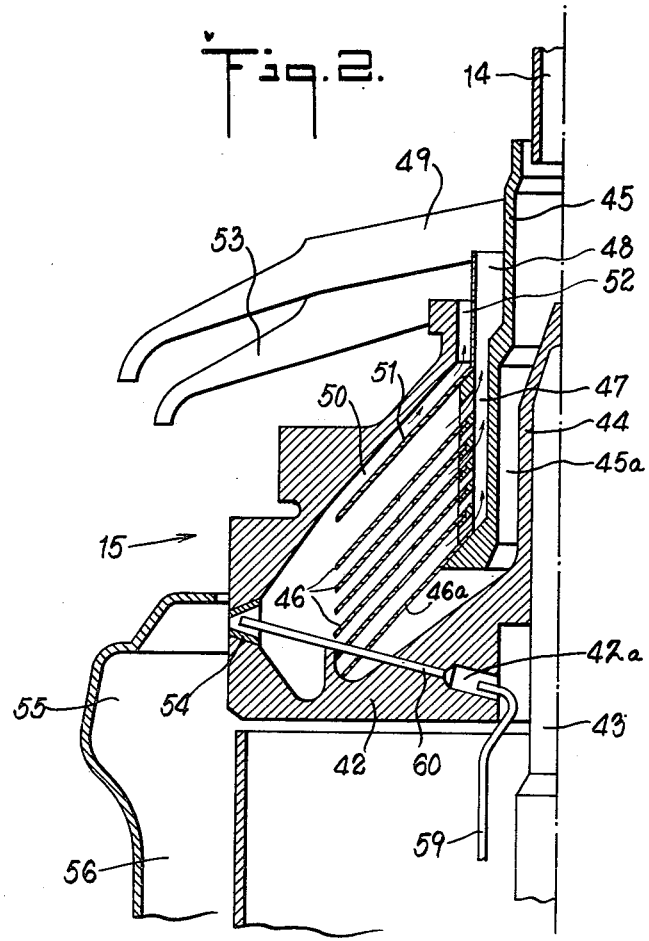

For a better understanding of the invention, reference may be had to the accompanying drawings, in which Fig. 1 is a schematic view of a system for use in carrying out the process, and Fig. 2 is a vertical sectional view of part of a centrifuge for use in effecting a three-way separation of the cocoa mixture.

Referring to the drawings, the reference numeral 1 designates a steam jacketed tank for heating filtered water delivered through an inlet line 1a. The steam for heating the water is fed into the jacketed space through a steam line 1b, the condensate being discharged through a pipe line 1c. Boiling water from the tank 1 is passed through a pipe line 2 into either of two coil vats 3—4. Pulverized cocoa is fed into either of these vats, as indicated at 6, and the boiling water from tank 1 is mixed with it in order to gelatinize the insoluble starch in the cocoa. Preferably, the mixture of cocoa and water is held for 20 minutes at a temperature of 185° F. in the vat 3 or 4. An enzyme, such as the diastatic enzyme produced by Pillsbury Mills and designated P73 is added to the mixture in the vat, after cooling the mixture to a temperature at which the enzymatic action is not inhibited, for example, 180° F. The enzyme is dispersed uniformly throughout the aqueous mixture of cocoa, and the mixture is allowed to stand for a time interval sufficient to saccharify the gelatinized starch, preferably about 20 minutes. A protein-coagulating agent, such as common salt, is then added to the mixture in the coil vat.

As an example of the preferred practice of the process, the batch thus prepared in either of the vats 3—4, may consist of 1766 lbs. of pulverized cocoa, 4500 lbs of water, 30 lbs of the above-identified P73 enzyme and 120 lbs. of common salt.

After addition of the protein-coagulating agent to the mixture in the vat 3 or 4, the mixture is fed through a pipe 8, pump 9 and pipe 10 to a pair of parallel-connecting filters 11. The filtering operation 11 serves to remove from the cocoa mixture the coarse solids which would tend to clog the centrifugal separator in the subsequent separating operation. From the filters 11, the mixture flows through a pipe 12, a flow regulator 13 and a pipe 14 to the centrifugal separator 15. The flow regulator 13 may be of any conventional type which operates to pass the mixture at a uniform rate to the centrifuge 15, in spite of any variations in the flow rate in advance of this regulator. I have found that unless substantial fluctuations in the feed rate to the separator 15 are prevented, the separating operation is impaired.

The centrifuge 15 is of the type which provides a three-way separation and discharge of the mixture, the heaviest separated component being discharged in jets through nozzles in the outer periphery of the centrifugal bowl. A centrifuge of the De Laval "AC-VO" type is an example of such a separator. The lightest component separated in the centrifuge 15 is a mixture of oil and water, more or less emulsified and containing some of the soluble extract of the cocoa and possibly some insoluble solids. This light component is discharged from the centrifuge through a conduit 16. The component of intermediate specific gravity consists mainly of a watery extract of the soluble cocoa solids, and it is discharged from the centrifuge through a conduit 17. The heaviest separated component has a relatively high content of insoluble solids and is in the form of a sludge. It is discharged through the peripheral nozzles of the centrifugal bowl through a discharge line 18. The separation in the centrifuge 15 is effected at a temperature of about 180° F.

The centrifuge 15 is adjusted to give a clean separation of oil from the heavier components.

Thus, while the oil and water component discharged through conduit 16 will contain some of the heavier components, the extract and sludge discharged through the conduits 17 and 18, respectively, will be practically free of oil.

The discharged extract in conduit 17 is returned to the discharged sludge in the conduit 18 and the merged components are fed through a pump 19 and pipe 20 to a coil vat 21, where they are subjected to further processing to be described presently.

The oil and water component discharged in the conduit 16 is delivered by a pump 23 and a pipe 24 to one of two stainless steel, jacketed tanks 25 and 25a. In the example previously specified, the amount of this component collected in tank 25 or 25a will be about 500 lbs. If the proportions of oil and water being delivered to tank 25 or 25a are not approximately equal, then boiling water is added to the oil and water mixture so as to keep the percentages of each approximately equal; and the pH value of the mixture is adjusted to 9, as by the addition of sodium bicarbonate. A protein-coagulating agent, preferably common salt in an amount of about 30 lbs., is also added to the mixture in the tank 25 or 25a. The mixture is then cooled to about 160° F. By means of the above-described treatment in the tank 25 or 25a, the oil and water emulsion is broken and the mixture is prepared for the second centrifuging operation.

From the holding tank 25 or 25a, the oil and water mixture is fed through a pipe 27, pump 28 and flow regulator 29, to a centrifuge 30. This centrifuge is of the type providing a two-way separation and discharge of the mixture. For example, it may be a De Laval centrifuge of the No. 720 type. In the centrifuge 30, the mixture is separated into a purified oil component and a water component, which are continuously but separately discharged through pipe lines 31 and 31a respectively. The discharged cocoa butter oil has a high degree of purity, but it may be subjected to further purification by passing it through a pump 32 into a tank 33 where it is mixed with about 1% of anhydrous calcium oxide and 2% of filter acid, the oil then being passed through a pump 34 and a filter press 35. The purified cocoa butter oil discharged from the filter 36 is in a form suitable for commercial use.

The water component separated in the second centrifuge 30 contains some of the watery extract separated with the oil in the first centrifuge 15. This water component is continuously discharged from the centrifuge 30 through the pipe line 31a and is returned by a pump 37 and conduit 38 to the sludge and extract components in the pipe 20. Thus, the material collected in the coil vat 21 consists of the two heavier components separated in the first centrifuge 15 and the water component separated in the second centrifuge 30. This material is in condition to be used directly in the production of a chocolate syrup. For this purpose, liquid sugar is added to the cocoa flavoring in the vat 21 through a pipe line 39, along with the other ingredients conventionally used for such syrups. The chocolate syrup may then be discharged from the coil vat 21 through pipe line 40.

Referring now to Fig. 2, a suitable form of the first centrifuge 15 comprises a centrifugal bowl 42 mounted on a driving spindle 43 for rotating the bowl on a vertical axis. The spindle 43 extends into a nave 44 at the central part of the bowl. The cocoa mixture is delivered by the pipe 14 into the upper end of a hollow tubular shaft 45 in the bowl. It then flows downwardly through passages 45a to the bottom portion of the bowl, from which it passes upwardly through distributing holes 46a in a set of conical discs 46 located in the separating chamber of the bowl. In the spaces between the discs 46, the oil in the cocoa mixture and some of the water are separated as a lighter component and pass inwardly to vertical passages 47 formed between the tubular shaft 45 and the inner edges of the conical discs. The oil and water mixture then passes upwardly through passages 47 and is discharged from the bowl through an annular outlet 48 surrounding the tubular shaft 45. The discharged oil and water component is collected in a stationary receiver 49 surrounding the upper part of the bowl and delivered to the conduit 16 (Fig. 1).

The remainder of the mixture separated between the discs 46 passes outwardly into a peripheral region of the bowl chamber outside the discs, where it is further separated into the intermediate component comprising mainly the watery extract of soluble cocoa solids, and a heavy component or sludge. The extract is discharged from the separating chamber through passages 50 formed between the bowl top and a top disc 51, the extract finally escaping from the bowl through an annular intermediate outlet 52 located between the bowl neck and the top disc 51. A stationary receiver 53 collects the discharged extract or intermediate component and delivers it to the conduit 17 (Fig. 1). The separated sludge or heavy component is discharged in jets through nozzles 54 in the outer periphery of the bowl. Due to the jet action of the sludge discharged through the nozzles, clogging of the bowl by the sludge is prevented. The sludge from the nozzles is collected in a stationary receiver 55, from which it passes through an outlet 56 to the discharge conduit 18 (Fig. 1). The impact of the sludge jets against the stationary receiver 55 serves to break up the sludge particles before they are merged with the extract component in the line 18.

In order to enable the use of larger discharge nozzles 54 and thereby reduce any tendency for the sludge to clog these nozzles, it may be desirable to re-circulate some of the sludge to the separating chamber in the vicinity of the nozzles 54. That is, some of the sludge may be withdrawn from the discharge conduit 18 by a pump 58 (Fig. 1) and forced through a pipe 59 into a central internal recess 42a in the bowl (Fig. 2). From the recess 42a, the recycled sludge is delivered by centrifugal force through radial tubes 60 leading to the region of or into the nozzles 54. In this way, the recycled sludge serves to hold back the lighter components and prevent their discharge through the nozzles 54, which can therefore be larger than would otherwise be possible.

The flow regulators 13 and 29 may, if desired, be in the form of surge tanks which feed th respective centrifuges 15 and 30 by gravity, so as to provide a continuous and easy flow. By the use of the two holding tanks 25 and 25a, the demulsification of the oil and water mixture from centrifuge 15 can be effected continuously, it being understood that first one holding tank and then the other feeds the second centrifuge 30.

I claim:

1. In the treatment of cocoa to produce cocoa butter and a substantially fat-free cocoa flavoring, the method which comprises heating an aqueous mixture of the cocoa in finely divided form to a temperature sufficient to gelatinize the insoluble starch content of the cocoa, reducing said temperature and saccharifying the gelatinized starch by treating the mixture with an enzyme, coagulating protein in the mixture, feeding the mixture into a locus of centrifugal force and there separating it into an oil and water component and a substantially oil-free component, simultaneously but separately discharging said components from the locus, at least partly breaking the emulsion of the oil and water component and recentrifuging it to separate it into oil and water phases, and returning said water phase to said substantially oil-free component and adding sugar thereto for production of a chocolate syrup.

2. A method according to claim 1, comprising also the step of hydrating the oil and water component, prior to said recentrifuging, to wash the oil and provide additional water in said returned phase for the syrup.

3. A method according to claim 1, comprising also adjusting the pH value of the discharged oil and water component to about 9 prior to said recentrifuging.

4. A method according to claim 1, comprising also the step of filtering said oil phase to remove residual solids therein.

5. A method according to claim 1, in which sodium bicarbonate and sodium chloride are added to the discharged oil and waer component and the pH value thereof is adjusted to about 9, prior to said recentrifuging.

6. A method according to claim 1, in which the discharged oil and water component is mixed with water, heated to an emulsion-breaking temperature, salted, and adjusted to a pH value of about 9, prior to said recentrifuging.

7. A process according to claim 1, comprising also the steps of centrifugally separating the substantially oil-free component in said locus into sub-components comprising, respectively, sludge and a watery extract of soluble chocolate solids, discharging the sludge in jets through the outer periphery of the locus while separately discharging said extract from the locus, and returning discharged sludge as well as said water phase to the discharged extract.

8. A method according to claim 1, in which said aqueous mixture comprises about 2.5 parts of water to 1 part of powdered cocoa by weight, said enzyme being diastatic and added in an amount of about 1–2% by weight of the cocoa, the protein-coagulating agent being sodium chloride added in an amount of about 6–7% by weight of the cocoa.

9. In the treatment of cocoa to produce cocoa butter and a substantially fat-free cocoa flavoring, the method which comprises heating an aqueous mixture of the cocoa in finely divided form to a temperature sufficient to gelatinize the insoluble starch content of the cocoa, reducing said temperature and saccharifying the gelatinized starch by treating the mixture with an enzyme, coagulating protein in the mixture, feeding the mixture into a locus of centrifugal force and there separating it into an oil and water component as a light constituent, sludge as a heavy constituent, and watery extract of soluble chocolate solids as an intermediate constituent, discharging the sludge in jets through the outer periphery of said locus while separately discharging the extract and the oil and water component from the locus, returning discharged sludge to the discharged extract and adding sugar thereto for production of a chocolate syrup, and at least partly breaking the emulsion of the discharged water and oil component and recentrifuging it to separate it into oil and water phases.

10. A method according to claim 9, comprising also the step of filtering said mixture after said gelatinizing and saccharifying operations but prior to feeding the mixture into the locus of centrifugal force.

11. A method according to claim 9, comprising also the step of continuously recirculating part of the discharged sludge to the peripheral part of said locus.

References Cited in the file of this patent

UNITED STATES PATENTS

| Number | Name | Date |
|---|---|---|
| 571,238 | Pieper | Nov. 10, 1896 |
| 1,650,356 | Hocker | Nov. 22, 1927 |
| 1,892,449 | Dengler | Dec. 27, 1932 |
| 2,287,444 | Morgenthaler | June 23, 1942 |
| 2,515,794 | Palmer | July 19, 1950 |